(12) United States Patent
Panzer et al.

(10) Patent No.: US 7,411,771 B2
(45) Date of Patent: Aug. 12, 2008

(54) ELECTRIC CIRCUIT ARRANGEMENT FOR CONTROLLING A SOLENOID-OPERATED FLUID VALVE

(75) Inventors: Karlheinz Panzer, Schwebheim (DE); Richard Knüttel, Rieneck (DE); Alexander Meisselbach, Rieneck (DE)

(73) Assignee: Bosch Rexroth AG, Stuttgart (DE)

( * ) Notice: Subject to any disclaimer, the term of this patent is extended or adjusted under 35 U.S.C. 154(b) by 21 days.

(21) Appl. No.: 10/583,478

(22) PCT Filed: Oct. 7, 2004

(86) PCT No.: PCT/EP2004/011191
§ 371 (c)(1),
(2), (4) Date: Feb. 21, 2007

(87) PCT Pub. No.: WO2005/064622
PCT Pub. Date: Jul. 14, 2005

(65) Prior Publication Data
US 2007/0146956 A1    Jun. 28, 2007

(30) Foreign Application Priority Data
Dec. 19, 2003    (DE) .................. 103 60 621

(51) Int. Cl.
*H01H 47/28* (2006.01)
(52) U.S. Cl. ....................... 361/160; 361/187
(58) Field of Classification Search ............ 361/139, 361/160, 187; 251/129.01, 129.05
See application file for complete search history.

(56) References Cited

U.S. PATENT DOCUMENTS

| 5,917,692 | A  | * | 6/1999  | Schmitz et al. | ............ 361/187 |
| 6,473,286 | B1 | * | 10/2002 | Itabashi et al. | ............ 361/154 |

FOREIGN PATENT DOCUMENTS

| DE | 24 26 512   | 12/1975 |
| DE | 37 04 586   | 2/1990  |
| DE | 40 04 413   | 8/1990  |
| DE | 40 13 393   | 6/1992  |
| DE | 195 15 640  | 10/1996 |
| DE | 198 51 732  | 5/1999  |
| DE | 100 57 375  | 4/2002  |
| GB | 2 335 797   | 9/1999  |
| JP | 60 081 582  | 5/1985  |
| JP | 03 255 284  | 11/1991 |
| JP | 03 256 515  | 11/1991 |
| JP | 08 162 325  | 6/1996  |

OTHER PUBLICATIONS

"Electric Amplifier Module for Controlling Directly Controlled Regulating Valves having an Electric Feedback of Type VT 11080, Series 2X" (RD 29 757/04.93) of the Mannesmann Rexroth GmbH, Apr. 1993, pp. 1-4.

* cited by examiner

*Primary Examiner*—Michael J Sherry
*Assistant Examiner*—Danny Nguyen
(74) *Attorney, Agent, or Firm*—Kenyon & Kenyon LLP

(57) ABSTRACT

An electric circuit arrangement for controlling a solenoid-operated fluid valve.

11 Claims, 3 Drawing Sheets

Stand der Technik

ELECTRIC CIRCUIT ARRANGEMENT FOR CONTROLLING A SOLENOID-OPERATED FLUID VALVE

FIELD OF THE INVENTION

The present invention relates to an electric circuit arrangement for controlling a solenoid-operated fluid valve.

BACKGROUND INFORMATION

Such a circuit arrangement is known from the printed publication "Electric Amplifier Module for Controlling Directly Controlled Regulating Valves having an Electric Feedback of Type VT 11080, Series 2X" (RD 29 757/04.93) of the Mannesmann Rexroth GmbH. The circuit arrangement has an amplifier circuit having an input stage and an output stage. The input stage is supplied with an electrical input signal, e.g. in the form of a direct voltage variable between 0 and 10 V. This voltage is in the most simple case a voltage tapped off from a potentiometer. Alternatively, this may be a voltage supplied by a programmable controller normally referred to as "SPS" or a voltage supplied by another primary controller. The voltage supplied to the input stage is used as a setpoint value for the current that is to be supplied to the solenoid coil. If required, other signals may be added in the input stage to form a control signal for the output stage. The output stage converts the control signal into a current. This current is supplied to the solenoid coil via connecting lines situated between the output stage and the solenoid coil. For this purpose, e.g. a range of the current between 0 and 1 A corresponds to a range of the input voltage from 0 to 10 V.

In order to satisfy the safety requirements of the ATEX regulations, it is necessary, among other things, to ensure that the surface temperature of the individual components of a system is always lower than the ignition temperature of the gas surrounding the components. In the case of electrically controlled fluid valves having a control element operated by a solenoid coil, the solenoid coil is a component that heats up in operation as a function of the current. What makes things more difficult in this regard is the fact that the boundary values for the current flowing across the solenoid coil in many cases lies just barely above the value required for the full deflection of the control element of the fluid valve. This means that the safety margin between the current required for the full deflection of the control element of the fluid valve and the boundary value of the current specified by the construction of the solenoid coil is in the order of only a few percent, e.g. 5% of the greatest operationally intended current. In normal operation, this boundary value is not reached; but a series of cases are conceivable, in which the boundary value of the current flowing across the solenoid coil is reached and even exceeded. This includes e.g. an overloading of the amplifier input in which the input voltage supplied to the input stage of the amplifier is greater than the input voltage associated with the greatest operationally intended current. Another case, in which a current exceeding the boundary value may occur is a faulty operation of the parameter setting of the amplifier on the part of the customer, which results in an output current that exceeds the greatest operationally intended current. Another conceivable case, in which a current exceeds the boundary value, may occur in the event of a short circuit between a line conducting an operating voltage and a connecting line leading from the amplifier to the solenoid coil. Printed publication RD 29 757/04.93 does not specify measures to prevent an unacceptably high heating of the solenoid coil in such cases.

From German Published Patent Application No. 195 15 640, a circuit arrangement is known for electrically controlling a solenoid-operated fluid valve. A controlled switch in the form of a contact of a contactor relay is situated in the connecting lines between an amplifier and a solenoid coil. This controlled switch is used to satisfy increased safety-related requirements such as must be met e.g. when using electrically operated hydraulic valves for controlling the flow of the pressure medium to cylinders that move the tools of a molding press. In a hazardous operating state it must be possible to shut down the machine in a safe manner. This is to occur e.g. if an end switch responds as the upper dead center of the press is reached, if an emergency switch has been operated or if a primary controller outputs an appropriate signal. In these cases, an enable signal is removed, which, in addition to the other functions it performs, also opens the controlled switch. If the valve is configured as a proportional valve having positive overlap and mechanical centering of the control piston, then, when no current is supplied to the solenoid coil, the control piston assumes a safe center position in which no pressure medium flows to or from the cylinder. Opening the controlled switch thus ensures that no current flows across the solenoid coil even in the case of an electrical fault of the amplifier. The circuit arrangement known from German Published Patent Application No. 195 15 640 does not address measures for preventing an unacceptably high heating of the solenoid coil.

A device for switching an electrohydraulic solenoid-operated directional control valve is known from German Published Patent Application No 24 26 512. Operating in normal operations as a switching transistor, a transistor, in accordance with a clocked control current that is supplied to its base terminal, connects in one switching state a solenoid coil to a supply voltage, while interrupting this connection in the other switching state. The magnitude of the current flowing across the solenoid coil is determined by the ohmic resistance of the solenoid coil and the magnitude of the supply voltage. For protecting the switching transistor, a protective circuit is provided, which opens a contact of a relay situated between the supply voltage source and the solenoid coil whenever a higher current than the normal operating current flows. In the case of a current that is only slightly greater than the normal operating current, the relay opens the contact between the supply voltage source and the solenoid coil. Afterward, the current flow remains interrupted due to a self-holding mechanism in the relay. In the case of a current that is significantly greater than the normal operating current, the control current of the switching transistor is additionally reduced in the time interval until the response of the relay. This circuit arrangement relates to an output stage, which applies a clocked voltage to a solenoid coil. No input stage is provided which converts a variable input voltage via a current controller or current regulator into a current corresponding to the magnitude of the input voltage such as e.g. in the circuit arrangement known from the printed publication RD 29 757/04.93 mentioned at the beginning. The problem of a limitation of the surface temperature of the solenoid coil is also not addressed.

SUMMARY OF THE INVENTION

The present invention is based on the objective of providing a circuit arrangement of the kind mentioned at the beginning, which allows for the surface temperature of a solenoid coil to be limited with increased safety, particularly by influencing the current flowing across the solenoid coil, even when there is only a small margin between the greatest current required in normal operation and the boundary value of the current corresponding to the maximum surface temperature of the solenoid coil.

This objective is achieved by the features of the present invention. The monitoring circuit forms a current-limiting control loop, which only intervenes when the current exceeds the upper threshold value. In this case, the monitoring circuit reduces the input voltage supplied to the input stage of the amplifier circuit. If the current nevertheless does not drop again below the upper threshold value, then the monitoring circuit interrupts a connecting line leading from the output stage of the amplifier circuit to the solenoid coil. Due to the reduction of the input voltage supplied to the input stage of the amplifier circuit, which initially occurs when the upper threshold value of the current is exceeded, the current can be reduced to values below the upper threshold value without immediately having to interrupt the connecting lines leading to the solenoid coil. This is advantageous, particularly when the upper threshold value of the current is exceeded slightly only for short periods, since in such cases—in contrast to a self-holding interruption of the connecting lines—the operation is not interrupted, which would require a restart on the part of the operating personnel. A self-holding interruption of the connecting lines occurs only when a fault is so grave that the current flowing across the solenoid coil cannot be reduced below the upper threshold value by reducing the input voltage supplied to the input stage of the amplifier arrangement. The measures according to the present invention thus increase the availability of machines having fluid valves that are located in explosive areas.

The voltage supplied to the input stage of the amplifier circuit may be reduced. Alternatively it is also possible to subtract a correction voltage from the setpoint voltage or to multiply the setpoint voltage by a correction factor in order to reduce the input voltage. The output voltage of the integration element may be limited in the upward direction to a value that is slightly greater than the maximum setpoint voltage. This ensures that the setpoint voltage is supplied to the input stage of the amplifier circuit in fault-free operation. In addition it is ensured that the voltage supplied to the input stage of the amplifier circuit is reduced as soon as possible when the time average of the current flowing across the connecting lines exceeds the upper threshold value. The time-delay element connected in incoming circuit to the comparator prevents the monitoring circuit from already intervening when the upper threshold value for the current is exceeded only briefly. The absolute-value generator allows for current monitoring regardless of the direction in which the current flows across the solenoid coil. The part of the monitoring circuit that interrupts the current flow in the event of a fault may be refined. In this connection, the time following which the monitoring circuit interrupts a connecting line, after the current has exceeded the upper threshold value, is determined by the voltage corresponding to the lower threshold value and the time constant of the integration element. The second comparator and of the bistable switch connected in outgoing circuit to the latter may be refined. The monitoring circuit in an amplifier circuit that controls one of two solenoid coils as a function of the sign of the setpoint voltage may be simplified. For this purpose, use is made of the fact that in normal operation at most one of the two solenoid coils is supplied with current and that in the event of a fault an interruption even of the lines leading to the other solenoid valve is normally not disadvantageous.

DETAILED DESCRIPTION

Figure 1:
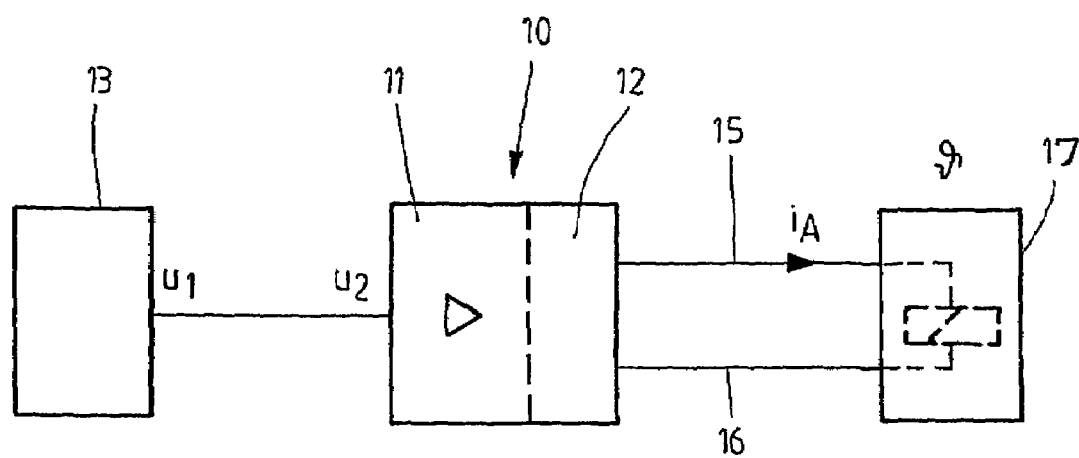
FIG. 1 shows a block diagram of a circuit arrangement according to the related art.

FIG. 1 shows a simplified block diagram of a known electrical circuit arrangement for controlling a solenoid-operated fluid valve, particularly a valve for a hydraulic pressure medium. An amplifier circuit 10 having an input stage 11 and an output stage 12 converts an input voltage $u_2$ into a current $i_A$. Input voltage $u_2$ is the output voltage $u_1$ of a setpoint adjuster 13, e.g. a voltage tapped off from a potentiometer. Output voltage $u_1$ is adjustable within a range, e.g. between 0 V and +10 V (corresponding to 0% to 100% of the setpoint value). If setpoint adjuster 13, on the other hand, provides a current as output variable, then a signal converter (not shown) is situated between setpoint adjuster 13 and input stage 11, which converts the output current of setpoint adjuster 13 into a voltage of a corresponding magnitude. The current $i_A$ provided by output stage 12 is supplied to a solenoid coil 17 via connecting lines 15 and 16. Output stage 12 of amplifier circuit 10 normally supplies a pulse-width modulated current to solenoid coil 17.

On the one hand, the current flow in solenoid coil 17 generates a magnetic force, while on the other hand also causing solenoid coil 17 to heat up. The heating of the surface of solenoid coil 17 is of special significance for explosion protection. The surface temperature of solenoid coil 17, indicated in the following by the letter $\vartheta$, must always be lower than the ignition temperature of the gas surrounding the solenoid coil. This requirement for explosion protection is satisfied if current $i_A$ flowing across solenoid coil 17 is smaller than a boundary value at which a still permissible surface temperature $\vartheta_{zu1}$ sets in. What is problematic about this, however, is the fact that the current corresponding to this temperature is only slightly greater than the current corresponding to a setpoint value of 100%. This means that when the current corresponding to a setpoint value of 100% is only slightly exceeded, an unacceptable state is already reached. The circuit arrangements according to the present invention described in the following with reference to FIGS. 2 and 3 nevertheless allow for a safe operation of the solenoid coil in an explosive environment. For this purpose, the circuit arrangement according to the present invention is configured in such a way that the current is first limited to a safe value and only then, if in the case of a critical fault this measure is insufficient, the valve is taken out of operation by interrupting the flow of current to the solenoid coil.

Figure 2:
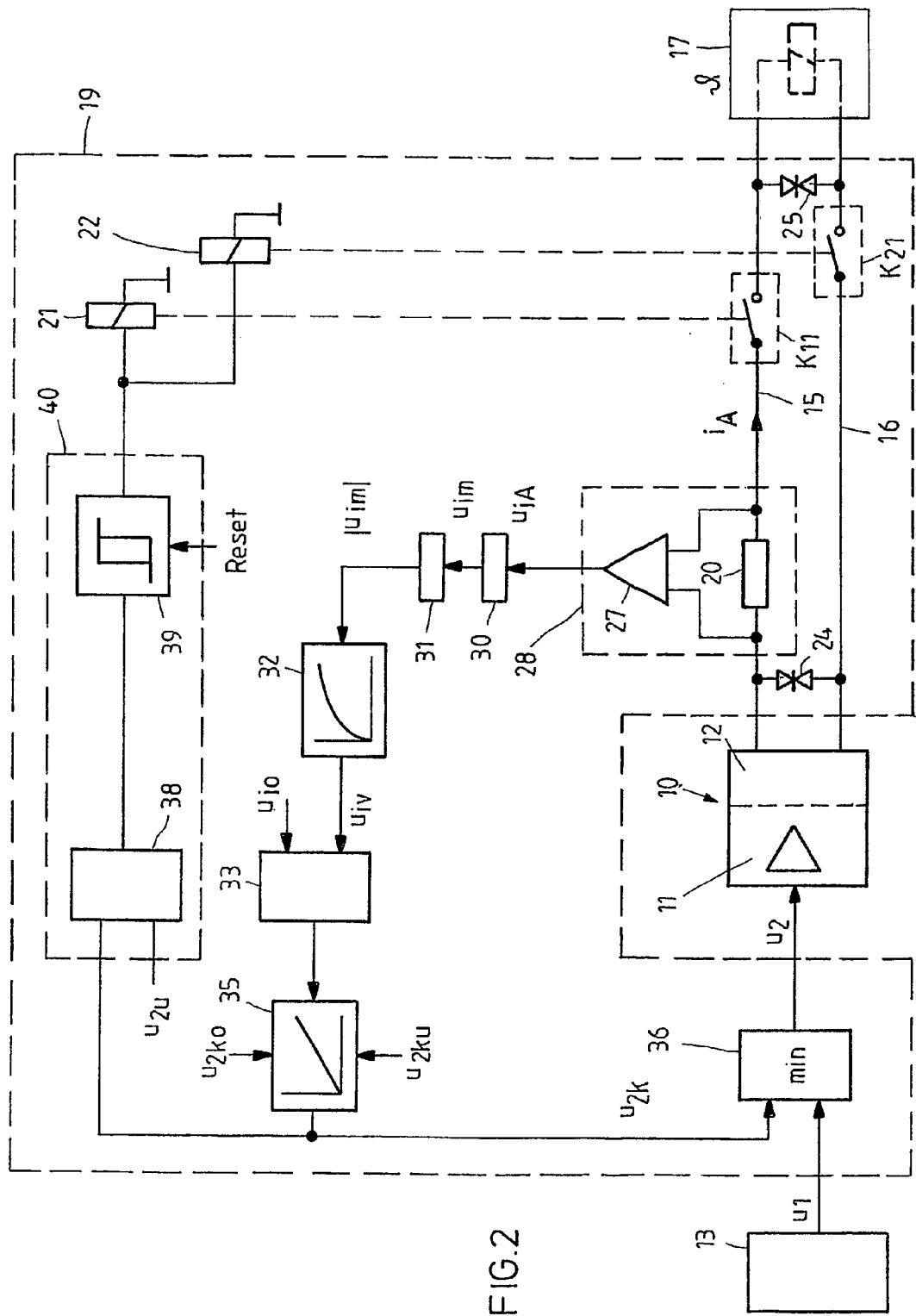
FIG. 2 shows a block diagram of a first circuit arrangement configured according to the present invention.

FIG. 2 shows a first circuit arrangement according to the present invention for controlling a solenoid-operated fluid valve in an explosive environment. An essential component of this circuit arrangement is a monitoring circuit 19, which is connected in incoming circuit to input stage 11 of amplifier circuit 10 and in outgoing circuit to its end stage 12. The fact that monitoring circuit 19 is not integrated into amplifier circuit 10 has the advantage that any desired valve amplifier circuits may be utilized. In particular, amplifier circuits may be used that have already proven reliable in the past. In this connection it is particularly advantageous that these amplifier circuits require no Ex protection approval of their own. The series circuit of a measuring resistor 20 and a contact $K_{11}$ of a first relay 21 is situated in connecting line 15. A contact $K_{21}$ of a second relay 22 is situated in connecting line 16. Contacts $K_{11}$ and $K_{21}$ are "make contacts", which are closed only when the associated relay is excited. This means that contacts $K_{11}$ and $K_{21}$ open in the event of a failure of the supply voltage and that the circuit arrangement is then in a safe state. Bipolar Z diodes 24 and 25, which limit the voltage between connecting lines 15 and 16, are situated parallel to the output of output stage 12 and to solenoid coil 17. Bipolar Z diodes 24 and 25 are components of monitoring circuit 19.

The voltage dropping at measuring resistor 20 is supplied to a differential amplifier 27. Differential amplifier 27 converts the voltage dropping at measuring resistor 20 into a voltage $u_{iA}$ related to a reference potential. Measuring resistor 20 and differential amplifier 27 form a current-measuring device 28. An averager 30 forms the time average $u_{im}$ of voltage $u_{iA}$. This voltage corresponds with sufficient approximation to the current that is decisive for heating solenoid coil 17. An absolute-value generator 31 generates the absolute value $|u_{im}|$ of voltage $u_{im}$. It thus makes no difference whether current $i_A$ flows in the direction indicated by the arrow in FIG. 2 or in the opposite direction. Monitoring circuit 19 thus only evaluates the magnitude of current $i_A$. The sequence of averager 30 and absolute-value generator 31 may also be reversed such that first the absolute value is generated and subsequently the average is formed. The absolute value $|u_{im}|$ of voltage $u_{im}$ is supplied to a time-delay element 32, the output voltage of which is designated as $u_{iv}$. Voltage $u_{iv}$ and a voltage $u_{io}$, which corresponds to an upper threshold value of the current $i_A$ flowing across connecting lines 15 and 16, are supplied to a first comparator 33. An integration element 35 is connected in outgoing circuit to comparator 33. The output voltage of integration element 35 is designated by $u_{2k}$. If in normal operation voltage $u_{iv}$ is smaller than upper threshold value $u_{io}$, then comparator 33 will control integration element 35 in such a way that its output voltage $u_{2k}$ rises until it reaches an upper value $u_{2ko}$, which limits voltage $u_{2k}$ in the upward direction. Upper value $u_{2ko}$ is selected in such a way that it is slightly greater than setpoint voltage $u_{1[100\%]}$ corresponding to a setpoint value of 100%. It is important that value $u_{2ko}$ is not selected to be smaller than setpoint voltage $u_{1[100\%]}$. If at excessively large values of current $i_A$ voltage $u_{iv}$ is greater than upper threshold value $u_{io}$, then comparator 33 will control integration element 35 in such a way that its output voltage $u_{2k}$ decreases until it reaches a lower value $u_{2ku}$, which limits voltage $u_{2k}$ in the downward direction. Lower value $u_{2ku}$ is selected in such a way that it is smaller than a lower threshold value $u_{2u}$. In normal operation, voltage $u_{2k}$, which is used here as the correction voltage, is equal to upper value $u_{2ko}$. Monitoring circuit 19 contains a minimum value selection element 36, the inputs of which are supplied with setpoint voltage $u_1$ and correction voltage $u_{2k}$. Minimum value selection element 36 is connected in incoming circuit to input stage 11 of amplifier circuit 10 and supplies the smaller of the voltages $u_1$ and $u_{2k}$ as input voltage $u_2$ to input stage 11. If input stage 11 has a current input instead of the voltage input, then there is a conversion (not shown here) of voltage $u_2$ into an input current, which amplifier circuit 10 converts into current $i_A$ supplied to solenoid coil 17. If current $i_A$ exceeds the maximum permissible value with respect to the heating of solenoid coil 17, current $|u_{im}|$ increases accordingly. If voltage $u_{iv}$ that is delayed with respect to voltage $|u_{im}|$ has become greater than voltage $u_{io}$, then correction voltage $u_{2k}$ is lowered starting from voltage $u_{2ko}$. Minimum value selection element 36 supplies setpoint voltage $u_1$ to input stage 11 until correction voltage $u_{2k}$ has become smaller than $u_1$. Subsequently, minimum value selection element 36 supplies correction voltage $u_{2k}$ to input stage 11, which is now smaller than the previously active setpoint voltage $u_1$. The reduction of voltage $u_2$ supplied to input stage 11 results, e.g. in the event of just a slight overload of amplifier circuit 10, in a reduction of current $i_A$. Voltage $u_{iv}$ supplied to comparator 33 is also reduced in a corresponding manner until it again falls below voltage $u_{io}$ corresponding to the upper threshold value. From this time onward, voltage $u_{2k}$ increases again. Comparator 33 in this instance acts as a two-position controller of a control loop limiting the average value of current $i_A$.

Additionally, correction voltage $U_{2k}$ together with a voltage $U_{2u}$ corresponding to a lower threshold value is supplied to a second comparator 38. Comparator 38 controls a bistable switch 39, which in turn controls relays 21 and 22. Comparator 38 and bistable switch 39 are situated in such a way that relays 21 and 22 are excited for as long as correction voltage $u_{2k}$ is greater than lower threshold value $U_{2u}$. If in the event of a critical fault, e.g. a short circuit between the supply voltage and a connecting line, the above-described reduction of the setpoint signal does not result in a reduction of current $i_A$ below the maximum permissible value, correction voltage $u_{2k}$ is reduced further until it falls below the lower threshold value $u_{2u}$. The time in which correction voltage $u_{2k}$ falls from value $u_{2ko}$ to value $u_{2u}$ is determined by the difference of these voltage values and the time constant of the integration element. If correction voltage $u_{2k}$ falls below lower threshold value $u_{2u}$, then comparator 28 switches bistable switch 39 over into the other position, and bistable switch 39 interrupts the voltage supply to relays 21 and 22. Relays 21 and 22 drop out and contacts $K_{11}$ and $K_{21}$ interrupt connecting lines 15 and 16 leading to solenoid coil 17. Bistable switch 39 maintains its position until being switched back into its original position by a separate reset signal following a repair of the fault. Comparator 38 and bistable switch 39 may also be implemented as comparator 40 having a self-holding mechanism. Relays 21 and 22 effect a 2-pole separation of solenoid coil 17 from output stage 12 of amplifier circuit 10. If one of the contacts $K_{11}$ or $K_{21}$ sticks, then there is at least a monopole separation of solenoid coil 17 from output stage 12. It is essential that the flow of current to solenoid coil 17 is interrupted also in such a case and that the surface temperature of solenoid coil 17 does not continue to rise.

Figure 3:
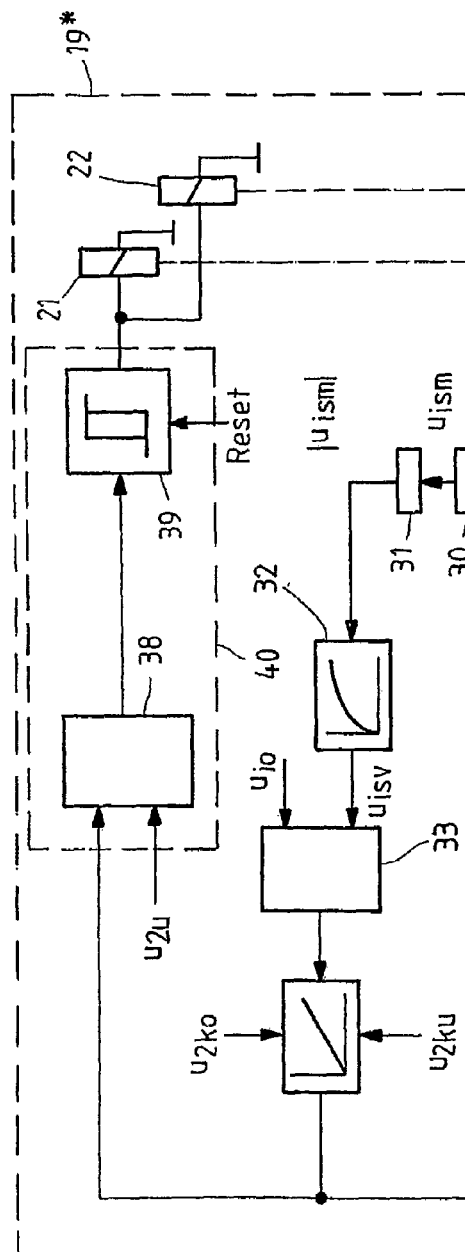
FIG. 3 shows a block diagram of a second circuit arrangement configured according to the present invention.
Figure 3:
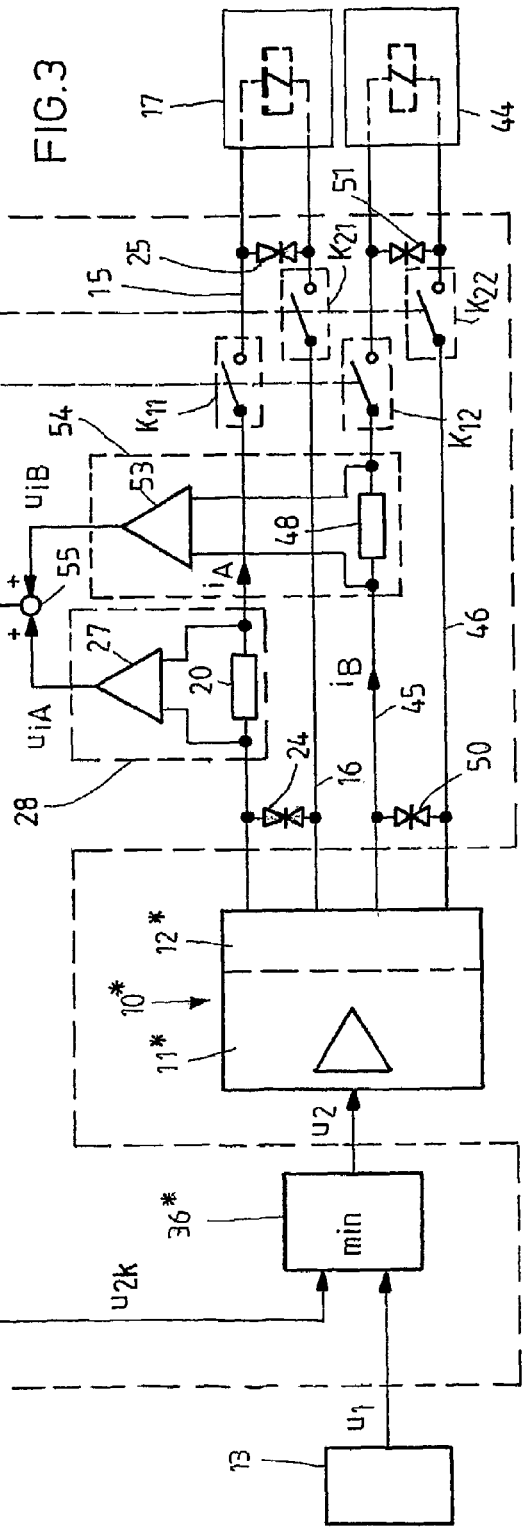

FIG. 3 shows a second circuit arrangement according to the present invention for controlling a fluid valve. This exemplary embodiment shows an amplifier circuit 10* controlling two solenoid coils 17 and 44 in combination with a monitoring circuit 19*. Since FIG. 3 builds on FIG. 2, only those parts are described in the following which are additional in FIG. 3 or which deviate from FIG. 2. Solenoid coil 17 is connected via connecting lines 15 and 16 to a first output of output stage 12* of amplifier circuit 10*. Second solenoid coil 44 is connected via connecting lines 45 and 46 to a second output of output stage 12* of amplifier circuit 10*. Amplifier circuit 10* is configured in such a way that its output stage 12* supplies current $i_A$ to solenoid coil 17 if setpoint voltage $u_1$ is positive, and a current $i_B$ is supplied to solenoid coil 44 if the setpoint voltage $u_1$ is negative. Such an amplifier circuit 10* makes it possible to deflect the control valve of a fluid valve from a central position into one of two opposite directions. The refinement of monitoring circuit 19* described with reference to FIG. 3 makes use of the fact that—as a function of the sign of the setpoint voltage $u_1$—current is supplied in each case only to one solenoid coil 17 or 44, while no current flows across the connecting lines running across the other solenoid coil. A measuring resistor 48 and another contact $K_{12}$ of relay 21 are situated in connecting line 45. Another contact $K_{22}$ of relay 22 is situated in connecting line 46. Like contacts $K_{11}$ and $K_{21}$, contacts $K_{12}$ and $K_{22}$ are configured as make contacts. Within monitoring circuit 19\*, a bipolar Z diode 50 is situated parallel to the second output of output stage 12\* and another bipolar Z diode 51 is situated parallel to solenoid coil 44. The voltage dropping at measuring resistor 48 is supplied to a differential amplifier 53. Differential amplifier 53 converts the voltage dropping at measuring resistor 48 into a voltage $u_{iB}$ related to the reference potential. Measuring resistor 48 and differential amplifier 53 form a second current-measuring device 54. A computing element 55 adds up voltages $u_{iA}$ and $u_{iB}$ to form a sum voltage $u_{iS}$. Since in normal operation at any time only one of the solenoid coils 17, 44 is supplied with current, sum voltage $u_{iS}$ is either equal to voltage $u_{iA}$ or equal to voltage $u_{iB}$. The further processing of voltage $u_{iS}$ therefore occurs in the same manner as described for voltage $u_{iA}$ with reference to FIG. 2. Averager 30 forms the time average $u_{iSm}$ of voltage $u_{iS}$. This voltage corresponds with sufficient approximation to the current that is decisive for heating solenoid coil 17 or 44. If in exceptional cases solenoid coils 17 and 44 do not exhibit the same heating behavior, then it is possible e.g. to use measuring resistors 20, 48 adapted to the respective heating behavior to ensure that voltages $u_{iA}$ and $u_{iB}$ are of equal magnitude when reaching the maximum permissible current. Absolute-value generator 31 generates the absolute value $|u_{iSm}|$ of voltage $u_{iSm}$. Thus in this exemplary embodiment it also does not matter in which direction currents $i_A$ and $i_B$ flow. Monitoring circuit 19\* thus only evaluates the absolute values of currents $i_A$ and $i_B$. The sequence of averager 30 and absolute-value generator 31 may also be reversed in this exemplary embodiment. The absolute value $|u_{iSm}|$ of voltage $u_{iSm}$ is supplied to time-delay element 32, the output voltage of which is designated as $u_{iSv}$. Voltage $u_{iSv}$ and voltage $u_{io}$, which corresponds to the upper threshold value of currents $i_A$ and $i_B$ respectively, are supplied to comparator 33, to which integration element 35 is connected in outgoing circuit. Minimum value selection element indicated by reference numeral 36\* combines setpoint voltage $u_1$ in such a way with correction voltage $u_{2k}$ that the smaller value in terms of absolute value is supplied as input voltage $U_2$ to input stage 11\* of amplifier circuit 10\* while maintaining the sign of setpoint voltage $u_1$. The shutdown of relays 21 and 22 occurs in the same manner as already described above with reference to FIG. 2 if correction voltage $u_{2k}$ has become smaller than lower threshold value $u_{2u}$.

Instead of minimum value selection element 36, according to the present invention it is also possible to connect an adapter circuit configured as a transmission element, having a controlled transmission factor α, in incoming circuit to input stage 11 and 11\* of amplifier circuit 10 and 10\* respectively. In this case, comparator 33 or integration member 35 connected to comparator 33 in outgoing circuit decreases transmission factor a starting from its maximum value for as long as voltage $u_{iv}$ (in FIG. 2) or voltage $u_{iSv}$ (in FIG. 3) is greater than voltage $u_{io}$ and increases transmission factor α again if voltage $u_{iv}$ or $u_{iSv}$ has again become smaller than voltage $u_{io}$.

What is claimed is:

1. An electric circuit arrangement for controlling a solenoid-operated fluid valve, comprising:
    a solenoid coil;
    connecting lines; and
    an amplifier circuit including an input stage and an output stage, the amplifier converting a voltage supplied to the input stage into a current of a corresponding magnitude, the current flowing from the output stage via the connecting lines to the solenoid coil;
    a monitoring circuit including a current-measuring device for the current, wherein:
        the monitoring circuit is supplied with a setpoint voltage determining a magnitude of the current,
        the monitoring circuit continuously reduces the voltage supplied to the input stage starting from the setpoint voltage if a time average of the current has exceeded an upper threshold value,
        the monitoring circuit interrupts a connecting line leading to the solenoid coil if the time average has not fallen again below the upper threshold value after a specifiable time, and
        the monitoring circuit increases the voltage supplied to the input stage again to the setpoint voltage after the time average of the current has fallen below the upper threshold value.

2. The electric circuit arrangement as recited in claim 1, further comprising:
    a first comparator that compares the time average of the output signal of the current-measuring device to an upper threshold value, wherein:
        the first comparator includes an integration element connected thereto in an outgoing circuit, an output voltage of which is limitable in such a way that it does not exceed an upper value,
        the output voltage of the integration element decreases for as long as the time average of the current exceeds the upper threshold value, and
        the output voltage of the integration element increases for as long as the time average of the current is less than the upper threshold value,
        the output voltage of the integration element and the setpoint voltage are supplied to a minimum value selection element, and
        the smaller of the two voltages of the input stage is supplied to the amplifier circuit.

3. The circuit arrangement as recited in claim 2, wherein the upper value is limitable to the output voltage of the integration element, at least equal to the maximum setpoint voltage.

4. The circuit arrangement as recited in claim 2, wherein the time average of the current is supplied to the comparator via a time-delay element.

5. The circuit arrangement as recited in claim 2, further comprising:
    an absolute-value generator connected between the current-measuring device and the comparator.

6. The circuit arrangement as recited in claim 2, further comprising:
    a second comparator; and
    a first relay including a first switching contact, wherein:
        the output voltage of the integration element and a voltage corresponding to a lower threshold value are supplied to inputs of the second comparator, and
        the second comparator controls the relay, and
        the switching contact interrupts a connecting line if the output voltage of the integration element has become smaller than the lower threshold value.

7. The circuit arrangement as recited in claim 6, further comprising:
    a second relay including a second switching contact, wherein:
        the second comparator controls the second relay, and
        the second switching contact interrupts another connecting line if the output voltage of the integration element has become smaller than the lower threshold value.

8. The circuit arrangement as recited in claim 7, further comprising:

a bistable switch situated between the second comparator and one of the first relay and the second relay, wherein:
the second comparator switches the bistable switch from a first position into a second position if the output voltage of the integration element (35) has become smaller than the lower threshold value, and
the bistable switch in the first position is reset by a separate reset signal.

9. The circuit arrangement as recited in claim 8, wherein the second comparator and the bistable switch are configured as a third comparator having a self-holding mechanism.

10. The circuit arrangement as recited in claim 6, further comprising:
an amplifier circuit for controlling two solenoid coils, the amplifier circuit controlling one of the solenoid coils in the case of a positive setpoint voltage and another of the solenoid coils in the case of a negative setpoint voltage;
a minimum value selection element for preserving a sign of the setpoint voltage, selecting a smaller value in terms of absolute value, and supplying it to the amplifier circuit as an input voltage;
a computing element for forming a sum of the voltages corresponding to the currents flowing across the solenoid lines, wherein a sum signal corresponding to the sum is supplied to the first comparator.

11. The circuit arrangement as recited in claim 10, further comprising:
two relays controlled by the second comparator, wherein each relay in each instance interrupts one of the connecting lines leading to the solenoid coils if the output voltage of the integration element has become smaller than the lower threshold value.

* * * * *